US010001191B2

(12) United States Patent
Mathai et al.

(10) Patent No.: US 10,001,191 B2
(45) Date of Patent: Jun. 19, 2018

(54) PNEUMATICALLY TUNED VEHICLE POWERTRAIN MOUNTS

(71) Applicant: FORD GLOBAL TECHNOLOGIES, LLC, Dearborn, MI (US)

(72) Inventors: Thomas Mathai, Farmington, MI (US); Hassan Dakhlallah, Dearborn, MI (US); Nigel King, Brentwood (GB); James F. Beck, Milford, MI (US); Nagari Achar, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 14/598,426

(22) Filed: Jan. 16, 2015

(65) Prior Publication Data

US 2016/0208884 A1   Jul. 21, 2016

(51) Int. Cl.
*F16M 13/00* (2006.01)
*F16F 13/00* (2006.01)

(52) U.S. Cl.
CPC ...... *F16F 13/002* (2013.01); *F16F 2228/066* (2013.01)

(58) Field of Classification Search
USPC ........................................................ 248/562
See application file for complete search history.

(56) References Cited

U.S. PATENT DOCUMENTS

| | | | |
|---|---|---|---|
| 4,840,358 A | 6/1989 | Hoying et al. | |
| 5,183,243 A * | 2/1993 | Matsumoto | F16F 13/10 267/140.11 |
| 5,240,233 A * | 8/1993 | Kato | F16F 13/10 267/140.13 |
| 5,386,977 A * | 2/1995 | Quast | F16F 13/26 267/140.13 |
| 5,462,261 A | 10/1995 | Eckel et al. | |
| 5,992,833 A * | 11/1999 | Tanahashi | F16F 13/264 267/140.13 |
| 6,055,317 A * | 4/2000 | Muramatsu | F16F 7/108 267/140.13 |
| 6,422,545 B1 | 7/2002 | Baudendistel et al. | |
| 6,439,556 B1 * | 8/2002 | Baudendistel | F16F 13/106 267/140.15 |

(Continued)

*Primary Examiner* — Monica E Millner
(74) *Attorney, Agent, or Firm* — Julia Voutyras; Brooks Kushman P.C.

(57) ABSTRACT

A system for securing a powertrain component to a body structure of a vehicle may include first and second mounts each having a base and a first elastomeric barrier secured to and extending from the base defining an air filled chamber, and a connector coupling the air filled chambers, the connector sized to provide an associated air volume that reduces stiffness of the first elastomeric barrier at an excitation frequency corresponding to a target engine speed. The air filled chambers may be hermetically sealed and pressurized above atmospheric pressure. The system may include a fluid-filled switchable mount having a decoupler air pocket selectively coupled to a vacuum source or atmosphere with an expander integrated with the mount or as a separate component coupled between the decoupler air pocket and the vacuum source. The expander may be implemented as a Helmholtz resonator or may include an in-line expansion chamber.

17 Claims, 8 Drawing Sheets

(56) References Cited

U.S. PATENT DOCUMENTS

| | | | | |
|---|---|---|---|---|
| 6,792,907 B1* | 9/2004 | Kostun | ............... | F01N 1/02 |
| | | | | 123/184.57 |
| 7,188,830 B2* | 3/2007 | Kato | ............... | F16F 13/106 |
| | | | | 267/140.14 |
| 7,194,344 B2 | 3/2007 | Gee et al. | | |
| 7,328,888 B2* | 2/2008 | Sakata | ............. | B60K 5/1208 |
| | | | | 267/140.13 |
| 7,428,947 B2* | 9/2008 | Nohl | ............ | F01N 1/163 |
| | | | | 181/237 |
| 8,360,403 B2* | 1/2013 | Xu | ............ | F16F 13/103 |
| | | | | 267/140.13 |
| 8,714,530 B2* | 5/2014 | Kanaya | ............ | F16F 13/106 |
| | | | | 267/140.11 |
| 2009/0008195 A1* | 1/2009 | Ueki | ............ | F16F 13/105 |
| | | | | 188/282.6 |
| 2010/0096789 A1* | 4/2010 | Gannon | ............ | B60K 5/1266 |
| | | | | 267/140.15 |
| 2016/0001648 A1* | 1/2016 | Kim | ............ | B60K 5/1283 |
| | | | | 248/566 |

\* cited by examiner

PNEUMATICALLY TUNED VEHICLE POWERTRAIN MOUNTS

TECHNICAL FIELD

This disclosure relates to pneumatically tuned passive and active/switchable mounts for connecting vehicle powertrain components to a vehicle underbody structure or chassis.

BACKGROUND

Various types of mounts have been used to secure vehicle powertrain components, such as an engine, electric motor, transmission, etc. to the underbody structure of the vehicle. Mounts may include rubber or similar elastomeric materials to dampen or isolate various types of motion associated with the vehicle powertrain to reduce transmission to the rest of the vehicle, particularly the vehicle cabin where it may be perceived by vehicle occupants as noise or vibration. Mounts may include various materials or features that provide a desired frequency response and may be selectively tuned by design or actively controlled during vehicle operation to provide more attenuation or damping at frequencies associated with certain powertrain component operating modes, such as engine idling or lugging, for example. Other damping or stiffness characteristics may be used to provide desired performance for operating modes having different characteristic frequencies that may be associated with road surface conditions, engine or motor speed changes, etc.

Hydraulic, hydroelastic, or hydro-mounts are commonly used in passenger car applications and include a chamber filled with glycol or hydraulic fluid to isolate idle and part/open throttle powertrain excitations, as well as for controlling vehicle shake under road inputs. Depending on the particular application and implementation, designs may include passive hydro-mounts or actively controlled/switchable hydro-mounts. Switchable hydro-mounts may include an idle mode of operation that provides a reduction in stiffness at the frequency range of engine firing order excitations at engine idle speeds, and a shake mode that provides increased damping for large excitations while concurrently providing low dynamic stiffness for small amplitude excitations at higher frequencies (such as 20 Hz and above) through a decoupler. Switching between a default mode (ride or cruise mode, for example) and idle mode is typically achieved by applying vacuum to the rubber membranes including the decoupler of the hydro-mount using an associated control valve. However, various designs may provide unfavorable stiffness during operating modes when vacuum is not applied, particularly within frequency ranges associated with operating modes such as engine lugging, for example.

SUMMARY

Various embodiments according to the present disclosure may include a system for securing a powertrain component to a body structure of a vehicle having first and second mounts each having a base and a first elastomeric barrier secured to and extending from the base defining an air filled chamber, and a connector coupling the air filled chambers, the connector sized to provide an associated air volume that reduces stiffness of the first elastomeric barrier at an excitation frequency corresponding to a target engine speed, such as an excitation frequency exceeding 20 Hertz associated with engine lugging conditions. The connector and air filled chambers may be hermetically sealed and may be pressurized above atmospheric pressure. The first and second mounts may each include a second elastomeric barrier secured to and extending from the base and enveloping the first elastomeric barrier, the second elastomeric barrier defining a fluid chamber having a fluid with a specific gravity greater than unity, such as hydraulic fluid or glycol, for example. Each base may include a channel connecting the fluid chamber to an associated fluid bellows chamber. The system may also include a switch selectively coupling the connector and air filled chambers to a vacuum source.

Embodiments may also include a method for mounting a powertrain component in a vehicle that includes pneumatically coupling air pockets of left and right powertrain mounts disposed between the powertrain component and a vehicle chassis using a connector having a size and length selected to reduce stiffness of the left and right mounts within at least one predetermined excitation frequency range. The method may include hermetically sealing the air pockets and the connector and pressurizing the air pockets to a pressure above atmospheric pressure. In various embodiments, the left and right powertrain mounts each include an elastomeric decoupler cooperating with a channel plate to form the air pockets, and an elastomeric cover cooperating with the channel plate to form a fluid filled chamber surrounding the elastomeric decoupler.

In some embodiments, a vehicle powertrain mounting system includes a channel plate defining air and fluid channels, an elastomeric decoupler cooperating with the channel plate and forming an air pocket coupled to the air channel and a vacuum source via a connector and valve, an elastomeric cover forming a fluid chamber that surrounds the decoupler and couples with a bellows chamber via the fluid channel, and an expander defining an air expansion chamber coupled to the air channel. The expander may have a volume of at least ten times a volume of the air pocket of the elastomeric decoupler to filter out air dynamics in the connector. The expander may include a first port coupled to the air pocket and a second port coupled to the connector. The expander may be integrated within a cap secured to the channel plate or disposed between the connector and the valve associated with the vacuum source. The valve may be operated based on vehicle operating parameters, such as engine speed and vehicle speed to alternatively couple the connector to the vacuum source or to atmosphere.

In some embodiments, a vehicle powertrain mounting system includes a channel plate defining air and fluid channels, an elastomeric decoupler cooperating with the channel plate and forming an air pocket coupled to the air channel and a vacuum source via a connector and valve, an elastomeric cover forming a fluid chamber that surrounds the decoupler and couples with a bellows chamber via the fluid channel, and a Helmholtz resonator having a volume coupled to the connector by a single input/output port. The Helmholtz resonator may be tuned based on an air column within the connector to reduce stiffness within a predetermined decoupler excitation frequency range, such as a frequency range associated with engine lugging conditions, for example.

Various embodiments according to the present disclosure may provide one or more advantages. For example, modifying or tuning of the natural frequency or frequency response of the air column associated with a hydro-mount decoupler may improve isolation in higher frequency ranges, such as 20 Hz and above. Insertion of an expansion chamber having several times the displaced volume of the decoupler may act as a mechanical filter for the air column frequencies to modify the frequency response. Similarly, use of a Helmholtz resonator tuned to a selected air column mode in the within a target frequency range may be used to modify the frequency response and improve isolation for a desired frequency range.

Embodiments according to the present disclosure having pneumatically coupled mounts have the ability to tune the air column mode(s) for dips in stiffness where lower stiffness is desired. Tuning of the air column may be accomplished with the area and length of the connector as well as the air pressure within the connector for embodiments having hermetically sealed couplings. In various embodiments, air tuning provides increased damping or dips at engine lugging frequencies while concurrently providing hydraulic damping for large amplitude shake reducing or eliminating the need for a lugging track. Coupling of left and right mounts may be used to increase stiffness where left and right motion is in-phase, such as produced by engine bounce. Various embodiments may incorporate tuned coupling of left and right mounts into existing switchable hydraulic mounts to provide active switching in combination with passive switching associated with in-phase motion of the left and right mounts.

The above advantages and other advantages and features will be readily apparent from the following detailed description of the embodiments when taken in connection with the accompanying drawings.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated, minimized, or omitted to show details of particular components. Therefore, specific structural and functional details disclosed herein are not to be interpreted as limiting, but merely as a representative basis for teaching one skilled in the art to variously employ the present invention. Various representative embodiments include components or features having similar construction and function as will be apparent to those of ordinary skill in the art. As such, features or components that are not described as being positioned or operating differently from those similar features or components described with respect to another embodiment are assumed to operate in a similar manner or perform a similar function although not explicitly labeled or described. Similarly, those of ordinary skill in the art will recognize that the block diagrams may omit certain details with respect to the hardware for securing the mount to a powertrain component, or to a vehicle chassis or other underbody structure.

Figure 1:
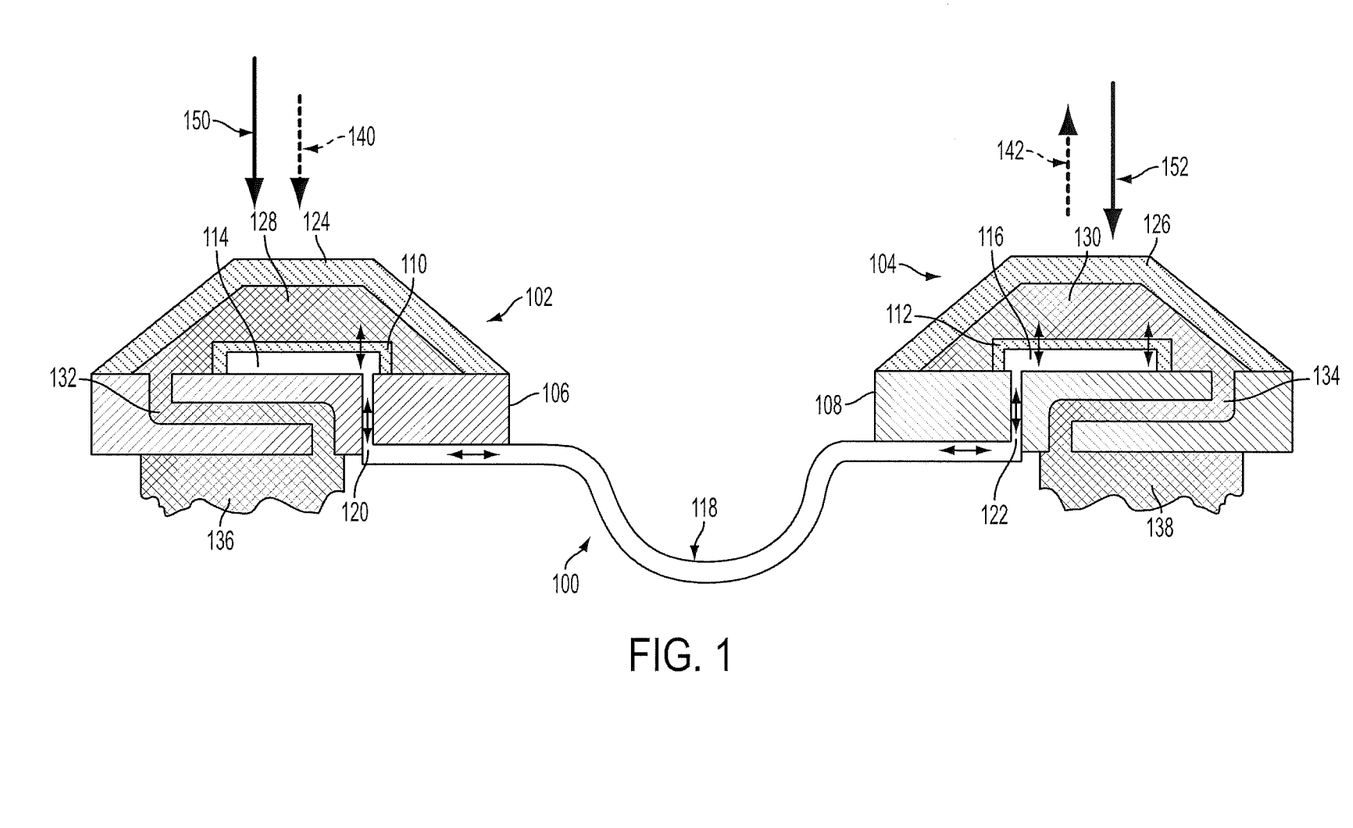
FIG. 1 is a block diagram illustrating a system or method for securing a powertrain component such as an engine, motor, and/or transmission to a vehicle structure having left and right hydraulic mounts with pneumatically connected decouplers according to various embodiments of the disclosure.

FIG. 1 is a block diagram illustrating a system or method for securing a powertrain component such as an engine, motor, and/or transmission to a vehicle structure having left and right hydraulic mounts with pneumatically connected decouplers according to various embodiments of the disclosure. System 100 includes a first mount 102 and a second mount 104 each having a base 106, 108, respectively, and a first elastomeric barrier 110, 112 secured to and extending from the base 106, 108 defining an air filled chamber 114, 116. A connector 118 couples the air filled chambers 114, 116 via corresponding air channels 120, 122 through bases or channel plates 106, 108. Connector 118 is sized to provide an associated air volume that reduces stiffness of the first elastomeric barriers 110, 112 at an excitation frequency corresponding to a target engine speed or excitation frequency, such as an engine lugging range, for example. Elastomeric barriers 110, 112 in combination with associated air pockets 114, 116 are often referred to as decouplers. In various embodiments, connector 118 is sized to provide an associated air volume that reduces stiffness of the first elastomeric barrier 110, 112 at an excitation frequency exceeding 20 Hertz.

In some embodiments, connector 118 and air-filled chambers or pockets 114, 116 may be hermetically sealed. Some embodiments may include a pressurized coupling with the air within connector 118 and decoupler air pockets 114, 116 having a pressure above ambient or atmospheric pressure. As the atmospheric (or barometric) pressure changes based on altitude and environmental conditions, the pressurized coupling may be pressurized based on a differential above current barometric pressure. Alternatively, the system pressure may be selected based on design considerations to best manage noise, vibration, and harshness (NVH) for a majority of anticipated operating conditions and fixed during vehicle assembly. Tuning of the air column coupling the complementary mounts can be accomplished using not only the area and length of connector 118, but the stiffness reduction or dip can be enhanced by increasing the pressure of the air within the column.

Figure 3:
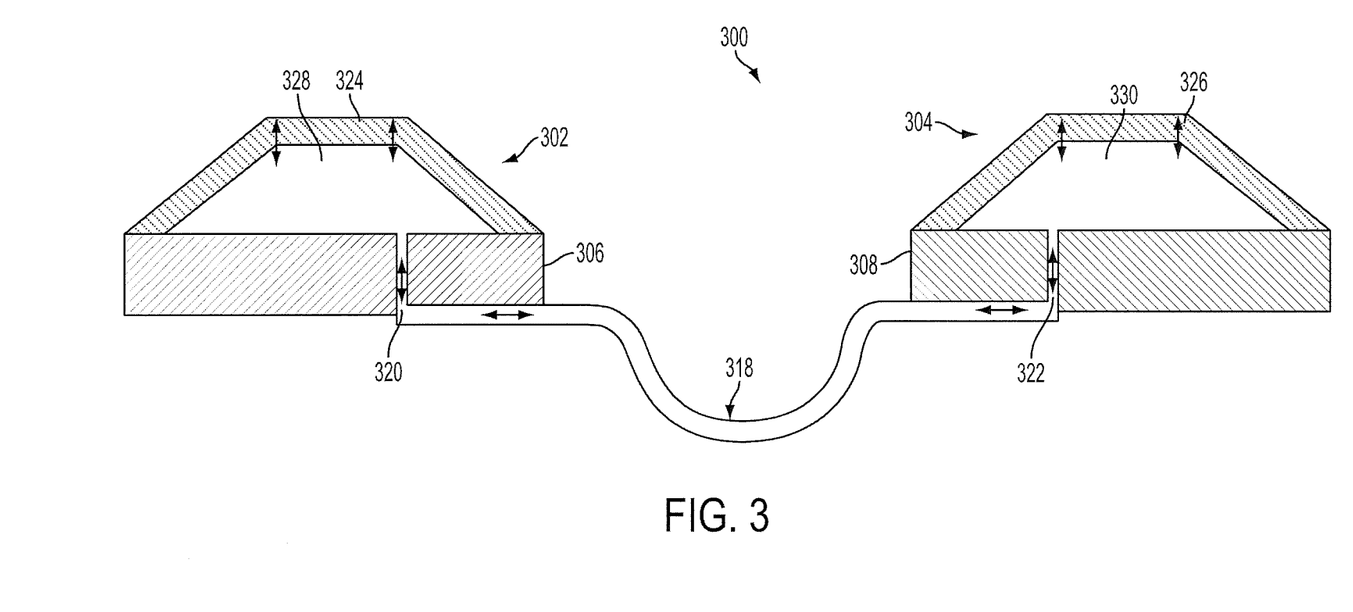
FIG. 3 is a block diagram illustrating a system for securing a powertrain component to a vehicle having passive left and right mounts with a hermetically sealed connector sized to tune the air column for reduced stiffness for targeted vehicle operating conditions according to various embodiments of the disclosure.
Figure 4:
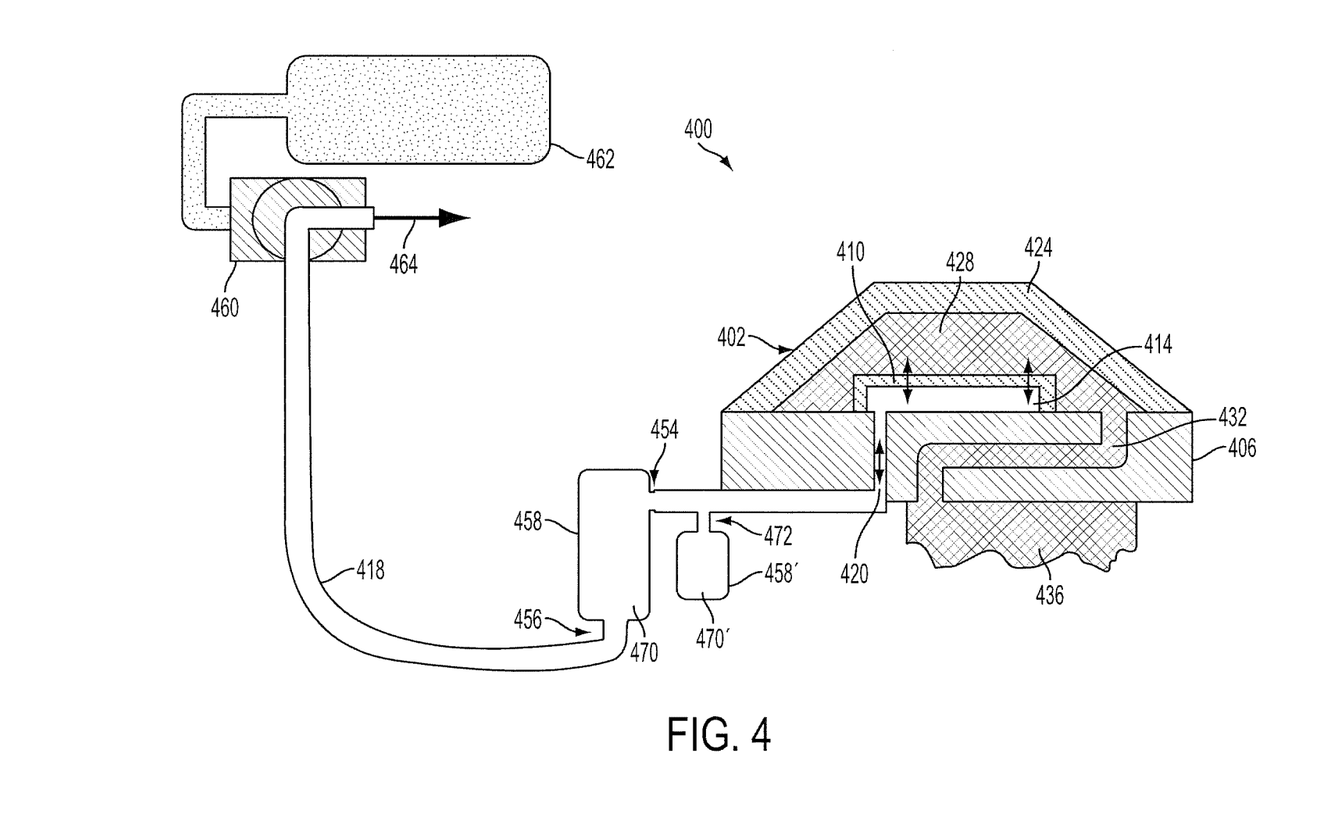
FIG. 4 is a block diagram illustrating a powertrain component mounting system or method having an expansion chamber or Helmholtz resonator positioned in-line between the decoupler and a vacuum source according to various embodiments of the disclosure.
Figure 8:
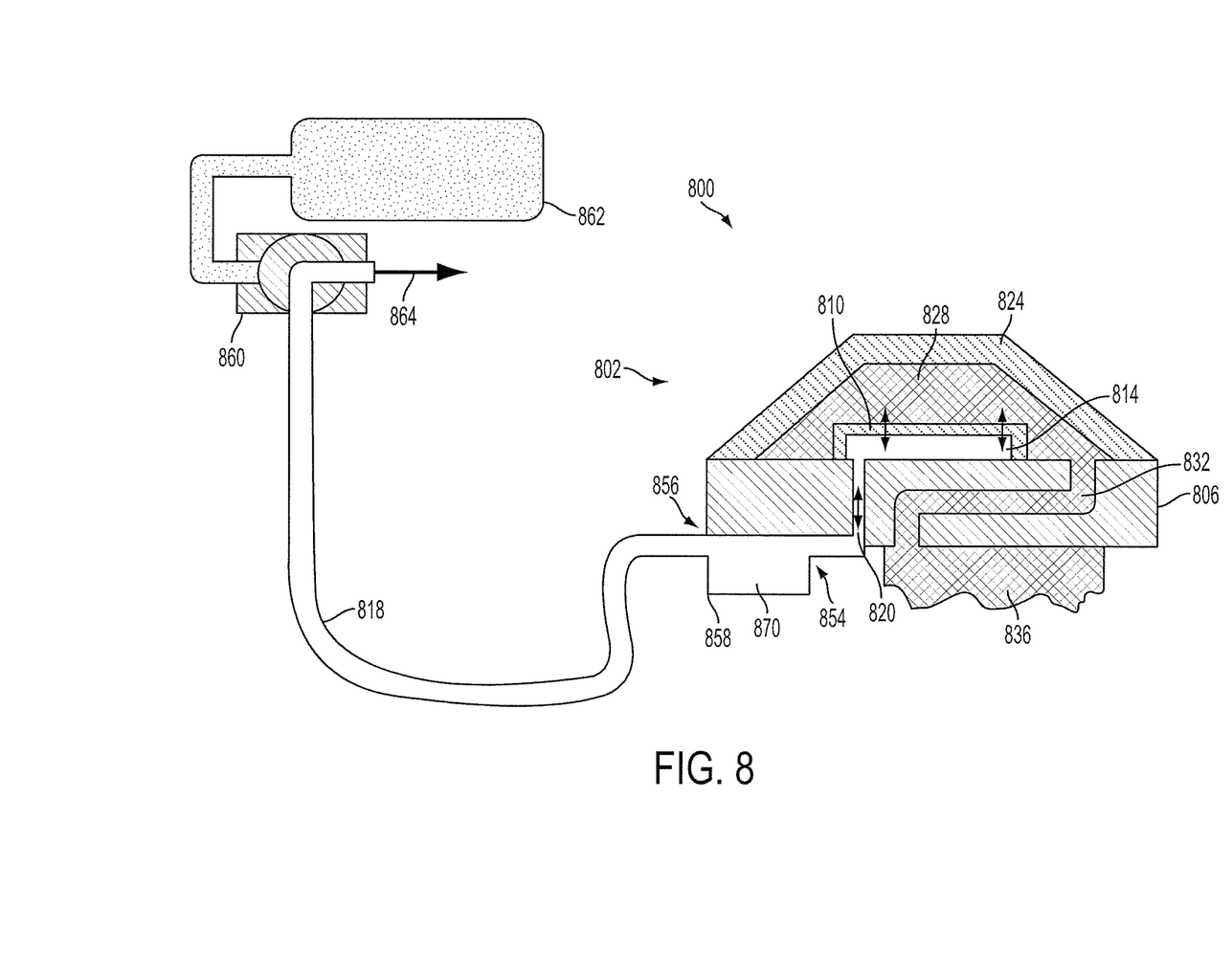
FIG. 8 is a block diagram illustrating a mount having an integrated expansion chamber associated with the air pocket of the decoupler according to various embodiments of the disclosure.
Figure 9:
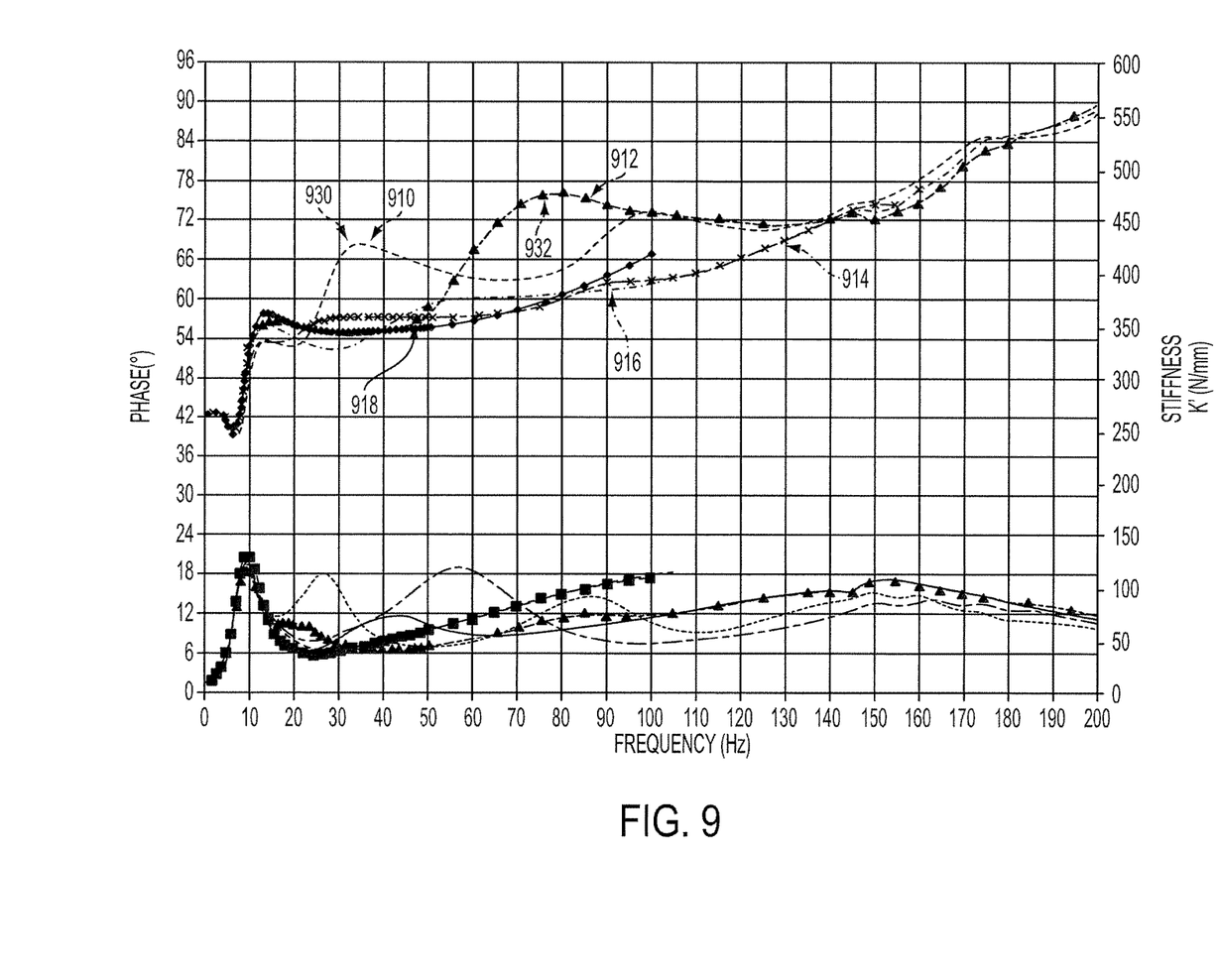
FIG. 9 is a graph illustrating comparisons of component-level stiffness phase and amplitude measurements for left-hand and right-hand mounts with vacuum lines, without vacuum lines, and with vacuum lines and expansions chambers according to various embodiments of the present disclosure.

As illustrated and described with respect to the embodiments of FIGS. 4, 8, and 9, for example, the embodiments of FIGS. 1 and 3 may also include a controllable solenoid valve to selectively connect connector 118 to a vacuum source, atmosphere, or a pressure source. In contrast to those embodiments where such a valve is used to alternatively couple the connector 118 and the associated air column to a vacuum source or vent to atmosphere, embodiments having two mounts 102, 104 coupled by a connector 118 may selectively control an associated valve to couple connector 118 and the associated air column to the vacuum source, to atmosphere, or to seal the pneumatic system. For applications and implementations employing a pressurized pneumatic coupling between complementary mounts 102, 104, a corresponding solenoid valve may be controlled to selectively couple connector to an air pump or compressor to increase air pressure above atmospheric or ambient barometric pressure. As generally understood by those of ordinary skill in the art, a controllable solenoid valve may be used to dynamically vary or modify the frequency response or stiffness amplitude and phase of the mount based on current powertrain and vehicle operating conditions to better manage NVH under varying road surface inputs, as well as vehicle and ambient operating conditions.

As also illustrated in the block diagram of FIG. 1, a second elastomeric barrier 124, 126 is secured to and extends from the base 106, 108 and envelops or surrounds the first elastomeric barrier 110, 112 and associated air pocket 114, 116. The second elastomeric barrier 124, 126 defines a fluid chamber 128, 130 having a fluid with a specific gravity greater than unity, such as hydraulic fluid or glycol, for example. Each base 106, 108 (or channel plate) includes a fluid channel 132, 134 connecting the fluid chamber 128, 130 to an associated fluid bellows chamber 136, 138.

As generally illustrated in FIG. 1, the pneumatically coupled hydraulic mounts may respond differently to various inputs depending on whether the inputs are in-phase or out-of-phase with respect to the mount locations. In one embodiment, a powertrain is secured to the underlying vehicle structure using two (2) mounts with one mount positioned on the left-hand (LH) side of the engine and the other mount positioned on the right-hand (RH) side of the engine. Smaller amplitude vibrations generally categorized as contributing to NVH are indicated by arrows 140, 142 and excite the mounts out-of-phase. As such, one mount pushes (pressurizes) the air column while the other mount pulls (creates vacuum) in the air column providing harmonic excitation from both ends. In contrast, larger amplitude inputs, such as powertrain bounce produce inputs generally indicated by arrows 150, 152, which are in-phase or in generally the same direction at the same time. Coupling of the complementary LH and RH mounts facilitates air column tuning to provide reduced stiffness at lugging frequencies to better manage NVH while at the same time providing hydraulic damping for large amplitude shake, which may alleviate the need for a lugging track if the dip or stiffness reduction is sufficient. Alternatively, this arrangement can be used to enhance a lugging track, but would not benefit from the hydraulic damping at shake in these implementations. An arrangement such as illustrated in FIG. 1 provides passive switching for powertrain shake. Engine shake is usually dominated by engine bounce. Strategic tuning of the pneumatic coupling will increase the stiffness for shake where the LH and RH motion are in-phase as represented by arrows 150, 152, which increases the air pressure associated with the decoupler air pockets 114, 116 and connector 118.

Figure 2:
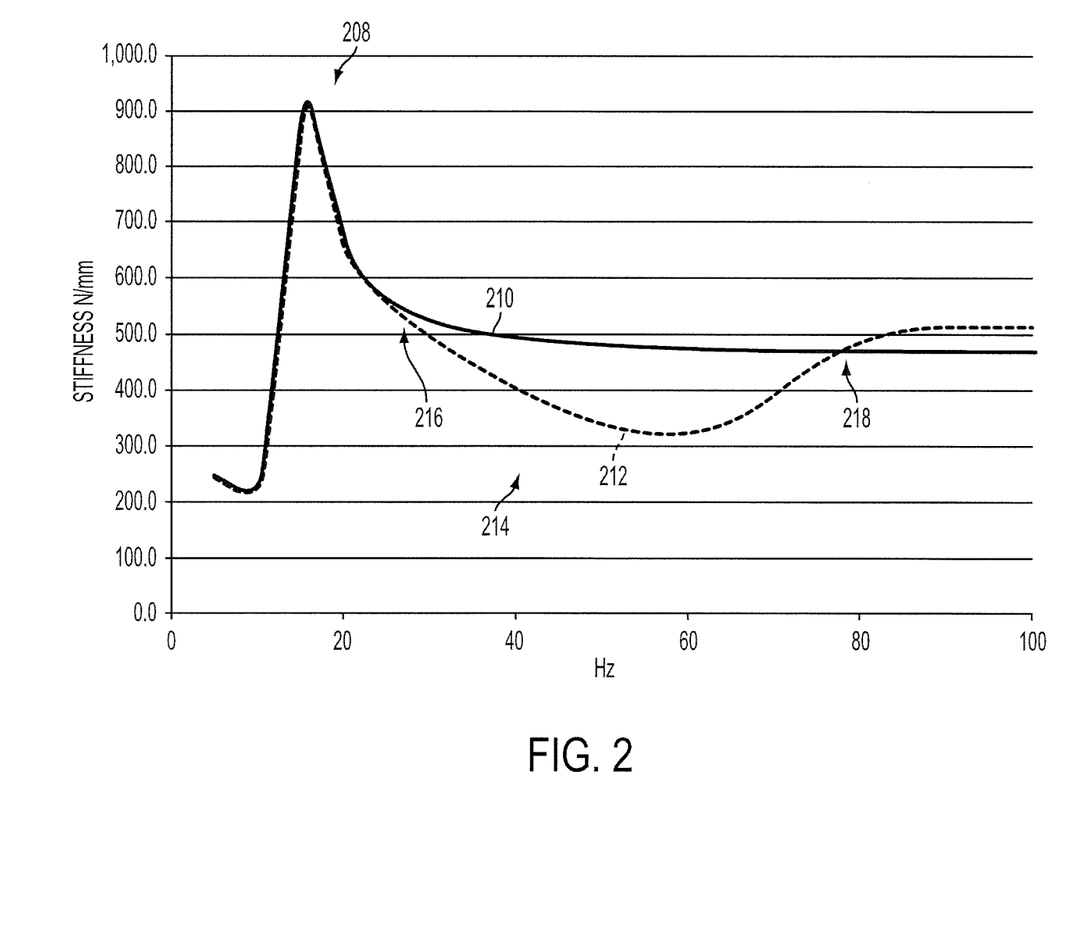
FIG. 2 is a graph illustrating stiffness reduction associated with air tuning and coupling of left and right powertrain mounts according to various embodiments of the disclosure.

FIG. 2 is a graph illustrating stiffness reduction associated with air tuning and coupling of left and right powertrain mounts according to various embodiments of the disclosure. Stiffness (N/mm) is plotted as a function of excitation frequency (Hz). Line 210 represents the stiffness response with conventional hydraulic tuning. Line 212 represents the stiffness response with the addition of air column tuning according to embodiments of the present disclosure. As illustrated, the stiffness peaks at 208 around 900 N/mm around 15 Hz. The conventional hydraulic mounts have a relatively flat response above about 20 Hz. In contrast, the addition of air tuning according to various embodiments provides reduced stiffness or a stiffness dip, generally indicated at 214, which begins above 20 Hz at 216 and extends to about 70 Hz at 218.

FIG. 3 is a block diagram illustrating a system for securing a powertrain component to a vehicle having passive left and right mounts with a hermetically sealed connector sized to tune the air column for reduced stiffness associated with targeted vehicle operating conditions according to various embodiments of the disclosure. System 300 includes hermetically sealed and pneumatically coupled complementary mounts 302, 304 each having a base or sealing plate 306, 308. An elastomeric barrier or cover 324, 326 cooperates with an associated sealing channel plate 306, 308, to define corresponding air-filled chambers 328, 330. Air channels 320, 322 extend through sealing channel plates 306, 308 to couple air-filled chambers 328, 330 to one another via connector 318. The embodiment of the powertrain mounts illustrated in FIG. 3 does not include decouplers and does not rely on fluid other than air (such as hydraulic fluid or glycol) to provide dynamic stiffness. Rather, the air column connecting chambers 328, 330 may be tuned by appropriate selection of the size and length of connector 318 as previously described. As with other embodiments described with respect to FIG. 1, the pneumatically coupled hermetically sealed system of FIG. 3 may also include a vacuum source and associated control valve, or may have pressurized air at a pressure exceeding atmospheric or ambient pressure. Embodiments as generally illustrated in FIG. 3 provide similar advantages with respect to providing reduced stiffness for target operating conditions, such as engine lugging conditions, for example.

FIG. 4 is a block diagram illustrating a powertrain component mounting system or method having an expansion chamber positioned between the decoupler and a vacuum source according to various embodiments of the disclosure. Vehicle powertrain mounting system 400 includes a channel plate 406 defining an air channel 420 and a fluid channel 432. An elastomeric decoupler 410 cooperating with channel plate 406 forms an air pocket 414 coupled to air channel 420 and a vacuum source 462 via a connector 418 and a valve 460. An elastomeric cover 424 cooperates with channel plate 406 forming a fluid chamber 428 that surrounds decoupler 410 and couples with a bellows chamber 436 via fluid channel 432. An expander 458 defines an air expansion chamber 470 coupled to air channel 420. Expander 458 may have a volume sufficient to generate a stiffness response substantially similar to when no vacuum is applied to decoupler 410. In one embodiment, expander 458 has a volume of at least ten times greater than a volume of the air pocket 414 of the elastomeric decoupler 410. As illustrated in FIG. 4, expander 458 is positioned in-line with air channel 420 and connector 418 with a first port 454 coupled to air pocket 410 and a second port 456 coupled to connector 418. Expansion chamber 470 acts as a mechanical filter for excitation from decoupler 410 as well as for feedback from vacuum tube or connector 418 into the decoupler air pocket 414. Addition of expansion chamber 470 prevents the air column resonant mode from being excited when operating in ride mode with valve 460 venting to atmosphere 464.

As also shown in FIG. 4, various embodiments may employ a Helmholtz resonator 458' having a chamber or reservoir 470' eliminating expander 458. As compared to expander 458, Helmholtz resonator 458' includes a single inlet/outlet port 472 that couples the volume or space of chamber 470' to connector 418. One or more Helmholtz resonators may be coupled to the air column to act as tuned dampers on acoustic modes of the air column. The Helmholtz air column mode may be tuned to the vacuum line 418 air column mode(s), which has the effect of dividing the air column modal excitation into two smaller resonances that occur at a higher and lower frequency that the resonance without the Helmholtz resonator. Helmholtz resonator 470' may be tuned based on the air column mode(s) within the connector 418 to reduce stiffness within a predetermined decoupler excitation frequency range. In various embodiments, the predetermined decoupler excitation frequency range corresponds to engine lugging conditions.

Figure 5:
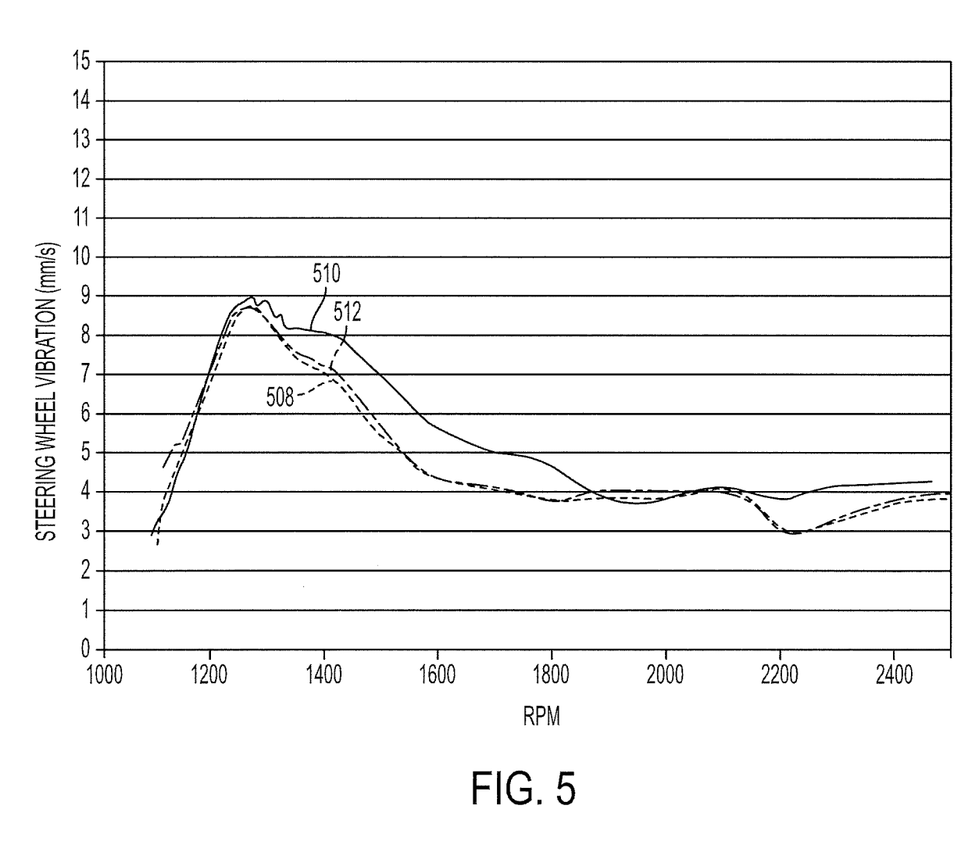
FIG. 5 illustrates the effect of powertrain mount stiffness tuning or reduction associated with an expansion chamber between the decoupler and vacuum source according to various embodiments of the disclosure.

FIG. 5 illustrates the effect of powertrain mount stiffness tuning or reduction associated with an expansion chamber between the decoupler and vacuum source according to various embodiments of the disclosure. The graph of FIG. 5 plots steering wheel vibration (mm/s) as a function of engine speed (RPM) to illustrate engine lugging response. Data represented by line 508 corresponds to active or switchable mounts with vacuum lines removed. Data represented by line 510 corresponds to active or switchable mounts with vacuum lines and associated air columns. Data represented by line 512 corresponds to mounts having an expander with an expansion chamber as illustrated and described with reference to FIG. 4, for example. As illustrated by lines 508 and 512, adding an expansion chamber in-line with the vacuum line or connector provides a substantially similar response as that provided when the vacuum lines are removed.

Figure 6:
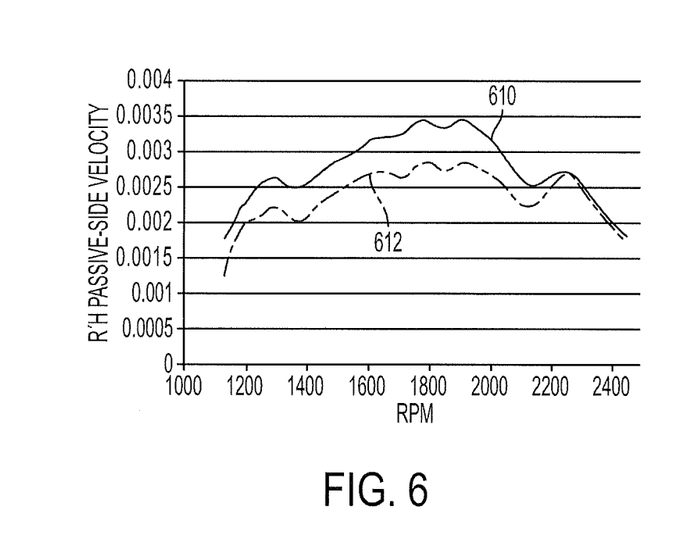
FIGS. 6 and 7 illustrate passive-side velocity improvements as a function of engine speed associated with a right-side and left-side mounts, respectively, having an expansion chamber according to various embodiments of the disclosure.
Figure 7:
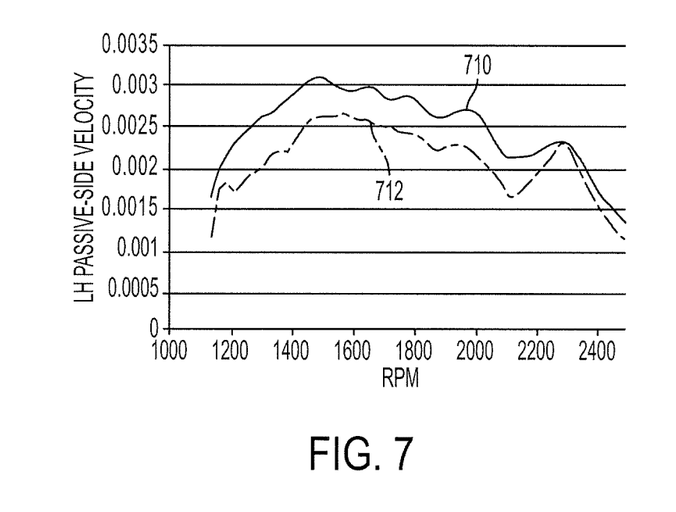

FIGS. 6 and 7 illustrate passive-side velocity improvements associated with an expansion chamber as a function of engine speed for right-side and left-side mounts, respectively. FIGS. 6 and 7 plot passive-side velocity as a function of engine speed to illustrate vehicle-level measurements for an engine lugging response. Data represented by lines 610, 710 correspond to conventional mounts without an expansion chamber. Data represented by lines 612, 712 correspond to mounts having an expansion chamber according to various embodiments. As illustrated in the plots of FIGS. 6 and 7, addition of an expansion chamber between the decoupler and vacuum source provides significant reductions at the mounts.

FIG. 8 is a block diagram illustrating a mount having an integrated expansion chamber associated with the air pocket of the decoupler according to various embodiments of the disclosure. Vehicle powertrain mounting system 800 includes a channel plate 806 defining an air channel 820 and a fluid channel 832. An elastomeric decoupler 810 cooperating with channel plate 806 forms an air pocket 814 coupled to air channel 820 and a vacuum source 862 via a connector 818 and a valve 860. An elastomeric cover 824 cooperates with channel plate 806 forming a fluid chamber 828 that surrounds decoupler 810 and couples with a bellows chamber 836 via fluid channel 832. An integrated expander 858 defines an integrated air expansion chamber 870 coupled to air channel 820. Expander 858 may have a volume sufficient to generate a stiffness response substantially similar to when no vacuum is applied to decoupler 810. In one embodiment, expander 858 has a volume of at least ten times greater than a volume of the air pocket 814 of the elastomeric decoupler 810. As illustrated in FIG. 8, expander 858 is positioned in-line with air channel 820 and connector 818 with a first port 854 coupled to air pocket 810 and a second port 856 coupled to connector 818. Expansion chamber 870 acts as a mechanical filter for excitation from decoupler 810 as well as for feedback from vacuum tube or connector 818 into the decoupler air pocket 814. Addition of expansion chamber 870 prevents the air column resonant mode from being excited when operating in ride mode with valve 860 venting to atmosphere 864.

FIG. 9 is a graph illustrating comparisons of component-level stiffness phase and amplitude measurements for left-hand and right-hand mounts with vacuum lines, without vacuum lines, and with vacuum lines and expansion chambers according to various embodiments of the present disclosure. All the configurations tested were operated in ride mode with no vacuum applied. FIG. 9 plots phase angle (degrees) and scaled stiffness (k*N/mm) as a function of excitation frequency (Hz). Data represented by lines 910, 912 correspond to RH and LH mounts, respectively, with vacuum lines. Data represented by lines 914, 916 correspond to RH and LH mounts, respectively, with vacuum lines and an expansion chamber having a volume of 30 cc. Data represented by line 918 corresponds to RH/LH mounts without vacuum lines. The stiffness peaks generally indicated at 930 and 932 are associated with the dynamic interaction of the air column modes in the vacuum lines in response to decoupler motion. The addition of 30 cc expansion chambers produces similar stiffness values as mounts without vacuum lines effectively eliminating the stiffness peaks.

As generally illustrated in the embodiments of FIGS. 1-3, a method for mounting a powertrain component in a vehicle may include pneumatically coupling air pockets of left and right powertrain mounts disposed between the powertrain component and a vehicle chassis using a connector having a size and length selected to reduce stiffness of the left and right mounts within at least one predetermined excitation frequency range. The method may further include hermetically sealing the air pockets and the connector, and pressurizing the air pockets to a pressure above atmospheric pressure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system, comprising:
    a vacuum source; and
    a powertrain mount comprising:
        a channel plate defining an air channel and a fluid channel and cooperating with
        an elastomeric decoupler forming an air pocket coupled to the air channel and vacuum source;
        an elastomeric cover forming a fluid chamber surrounding sides and top of the decoupler and coupling a reservoir via the fluid channel; and
        an expander defining an expansion chamber coupled to the air channel.

2. The system of claim 1 wherein the expander has a volume of at least ten times greater than a volume of the air pocket of the elastomeric decoupler.

3. The system of claim 1 wherein the expander includes a first port coupled to the air pocket and a second port coupled to a connector and valve associated with the vacuum source.

4. The system of claim 1 wherein the expansion chamber of the expander is coupled to a connector by a single input/output port, the connector disposed between the vacuum source and the air channel.

5. The system of claim 4, the expansion chamber being tuned based on an air column within the connector to reduce stiffness within a predetermined decoupler excitation frequency range.

6. The system of claim 1 wherein the expander is integrated within a cap secured to the channel plate.

7. The system of claim 1 wherein the expander is disposed between a connector and valve associated with the vacuum source.

8. The system of claim 7 wherein the valve operates to alternatively couple the connector to the vacuum source or to atmosphere.

9. A powertrain mount comprising:
    a channel plate;
    an elastomeric decoupler cooperating with the channel plate forming an air pocket coupled to a channel plate air channel;
    an elastomeric cover forming a fluid chamber that surrounds sides and top of the elastomeric decoupler and is coupled to a fluid reservoir via a channel plate fluid channel; and
    an expander coupled to the channel plate air channel.

10. The powertrain mount of claim 9 wherein the expander has a volume at least ten times greater than the air pocket.

11. The powertrain mount of claim 9 wherein the expander has a single input/output port.

12. The powertrain mount of claim 9 wherein the expander is coupled to the channel plate air channel by a connector, and wherein the expander is tuned based on an air column within the connector to reduce stiffness within a predetermined decoupler excitation frequency range.

13. A system comprising:
    a powertrain mount comprising:
        a channel plate having an air channel and a fluid channel and cooperating with an elastomeric decoupler forming an air pocket coupled to the air channel;
        an elastomeric cover containing fluid surrounding sides and top of the decoupler and coupled to the fluid channel; and
        an expander coupled to the air channel.

14. The system of claim 13 further comprising a vacuum source coupled to the air channel.

15. The system of claim 13 wherein the expander has a volume of at least ten times greater than a volume of the air pocket of the elastomeric decoupler.

16. The system of claim 13 further comprising a connector connecting the expander to the air channel, wherein the expander comprises a single input/output port.

17. The system of claim 13 further comprising:
    a vacuum source coupled to the air channel;
    a valve connected to the vacuum source; and
    a connector connecting the expander to the valve.

* * * * *